United States Patent
Mårtensson et al.

(10) Patent No.: US 9,202,262 B2
(45) Date of Patent: Dec. 1, 2015

(54) OPTIMIZED METHOD FOR ESTIMATING THE DOMINANT GRADIENT DIRECTION OF A DIGITAL IMAGE AREA

(71) Applicant: Sony Corporation, Tokyo (JP)

(72) Inventors: Linus Mårtensson, Lund (SE); Jonas Gustavsson, Iomma (SE); Jim Rasmusson, Vellinge (SE)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/413,124

(22) PCT Filed: Jan. 31, 2014

(86) PCT No.: PCT/IB2014/058718
§ 371 (c)(1),
(2) Date: Jan. 6, 2015

(87) PCT Pub. No.: WO2015/114410
PCT Pub. Date: Aug. 6, 2015

(65) Prior Publication Data
US 2015/0221068 A1    Aug. 6, 2015

(51) Int. Cl.
*G06K 9/40* (2006.01)
*G06T 5/00* (2006.01)

(52) U.S. Cl.
CPC ....... *G06T 5/002* (2013.01); *G06T 2207/10004* (2013.01)

(58) Field of Classification Search
CPC ... G06T 7/0083; G06T 7/0085; G06T 7/0012; G06T 3/403; G06T 2207/10016; G06T 2207/20144; G06T 2207/20061; G06T 2207/20136; G06T 2207/30024; G06T 2007/20192; G06T 2207/30168; G06T 2207/10024; G06T 2207/20132; G06T 2207/30072; G06T 2207/30148; H04N 5/02
USPC .......................................................... 382/255
See application file for complete search history.

(56) References Cited

U.S. PATENT DOCUMENTS

| | | | |
|---|---|---|---|
| 2004/0208350 A1* | 10/2004 | Rea et al. | 382/128 |
| 2007/0047838 A1* | 3/2007 | Milanfar et al. | 382/289 |
| 2007/0110319 A1 | 5/2007 | Wyatt et al. | |
| 2009/0324077 A1 | 12/2009 | Wu et al. | |
| 2015/0055837 A1* | 2/2015 | Rhoads | 382/128 |

OTHER PUBLICATIONS

Chen, J., et al., "WLD: A Robust Local Image Descriptor", IEEE Transactions on Pattern Analysis and Machine Intelligence, IEEE Computer Society, Sep. 1, 2010, pp. 1705-1720, vol. 32, No. 9, USA, XP011327420.

(Continued)

*Primary Examiner* — Ali Bayat
(74) *Attorney, Agent, or Firm* — Coats & Bennett, PLLC

(57) ABSTRACT

The solution disclosed herein reduces the amount of time and computational resources necessary to determine a dominant gradient direction of an image area comprising a plurality of pixels of an image. To that end, the dominant gradient direction of an image area is determined based on two gradient magnitudes determined from four sample points in the image area, where a direction of one of the gradient magnitudes is perpendicular to a direction of the other of the gradient magnitudes. The dominant gradient direction is then determined by taking the arctangent of the computed gradient magnitudes.

20 Claims, 5 Drawing Sheets

(56) References Cited

OTHER PUBLICATIONS

Wang, Y., et al., "Enhanced gradient-based algorithm for the estimation of fingerprint orientation fields", Applied Mathematics and Computation, Elsevier, Mar. 1, 2007, pp. 823-833, vol. 185, No. 2, USA, XP005908423.

Singh, C., et al., "Robust two-stage face recognition approach using global and local features", This Visual Computer, International Journal of Computer Graphics, Springer, Nov. 25, 2011, pp. 1085-1098, vol. 28, No. 11, Berlin, Germany, XP035123915.

* cited by examiner

OPTIMIZED METHOD FOR ESTIMATING THE DOMINANT GRADIENT DIRECTION OF A DIGITAL IMAGE AREA

TECHNICAL FIELD

The solutions disclosed herein relate generally to image noise reduction, and more particularly to the determination of a dominant gradient direction used to facilitate noise reduction techniques.

BACKGROUND

When processing or otherwise analyzing still or moving images (i.e., video), edge detection and/or edge direction determinations are often relied on. The "edges" of an image, i.e., the points of an image having discontinuities, may be used to process an image, for image pattern recognition, image analysis, etc. For example, image recording devices have traits that make the captured images susceptible to noise, e.g., random or white noise with no coherence, or coherent noise, e.g., such as introduced by the device itself. Such noise is particularly problematic for video recording devices. Because image details are often associated with image edges, and because image noise typically does not have such edges, noise reduction techniques typically search for and identify the "edges" of an image. By identifying the edges of an image, the noise reduction techniques can better determine how to filter out the noise without destroying the image details.

Some conventional edge detection techniques rely on the dominant gradient direction (DGD) associated with one or more blocks of pixels of an image, referred to herein as an image area. By determining the DGD of multiple image areas, a graphics processor can detect the edges of an image. Determining the DGD of each image area, however, is time consuming and computationally expensive. Thus, there is a need for improved DGD detection techniques.

SUMMARY

The solution disclosed herein significantly reduces the amount of time and computational resources necessary to determine the dominant gradient direction of an image area comprising a plurality of pixels of an image. The technique disclosed herein therefore significantly reduces the time and computational resources necessary to identify the edges of an image. To that end, the dominant gradient direction of an image area is determined based on two gradient magnitudes determined from at least four sample points in the image area, where a direction of one of the gradient magnitudes is perpendicular to a direction of the other of the gradient magnitudes. The dominant gradient direction is then determined by taking the arctangent of the computed gradient magnitudes.

One exemplary embodiment comprises a method of determining a dominant gradient direction of an image area comprising a plurality of pixels of an image. The method comprises sampling the image area to determine first, second, third, and fourth samples at respective first, second, third, and fourth locations in the image area, wherein a first direction between the first and third locations is perpendicular to a second direction between the second and fourth locations. The method further comprises determining a first gradient magnitude for the first direction based on the first and third samples, and determining a second gradient magnitude for the second direction based on the second and fourth samples. The method also comprises determining the dominant gradient direction of the image area based on an arctangent of a ratio between the first and second gradient magnitudes.

In one exemplary embodiment, a processing circuit is configured to determine a dominant gradient direction of an image area comprising a plurality of pixels of an image. To that end, the processing circuit comprises a sampling circuit, a magnitude circuit, and a direction circuit. The sampling circuit is configured to sample the image area to determine a first, second, third, and fourth samples at respective first, second, third, and fourth locations in the image area, wherein a first direction between the first and third locations is perpendicular to a second direction between the second and fourth locations. The magnitude circuit is configured to determine a first gradient magnitude for the first direction based on the first and third samples, and determine a second gradient magnitude for the second direction based on the second and fourth samples. The direction circuit is configured to determine the dominant gradient direction of the image area based on an arctangent of a ratio between the first and second gradient magnitudes.

DETAILED DESCRIPTION

Conventional techniques for computing the dominant gradient direction (DGD) are time consuming and computationally expensive. For example, each pixel in an image area generally has to be sampled one time for each of $m=0,1, 2, \ldots, M-1$, M different directions, where the image area comprises N×N pixels. As such, $N^2M$ directions needs to be determined for the N×N image area, where the determined directions are then used to determine the DGD for the image area, i.e., the "strongest" direction for the image area is selected as the DGD for the image area. This process is repeated for each image area in the image.

Figure 1:
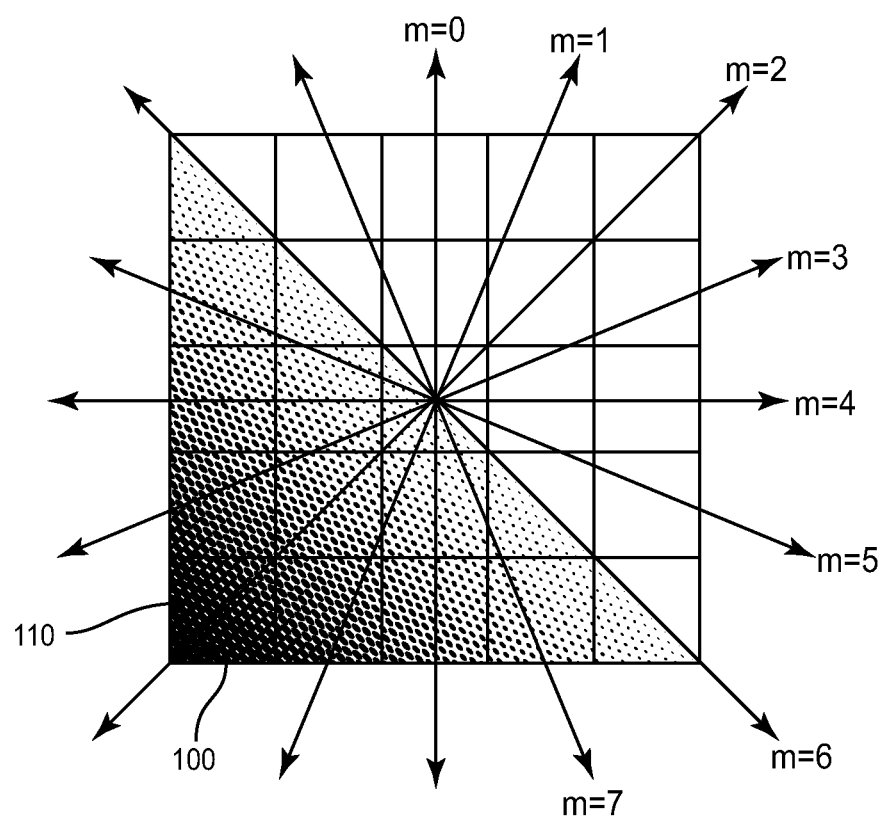
FIG. 1 shows an image area for an image, where the dominant gradient direction is determined according to conventional "brute force" techniques.

FIG. 1 shows an exemplary image area 100 of a gradient where the DGD is determined using such a conventional approach, where N=5 and M=8. For this example, each image area 100 includes 25 pixels 110. Thus, to determine the DGD for this one image area 100 using the conventional approach requires determining 8 directions for each of the 25 pixels, and therefore requires the calculation of a total of 200 directions. Given that a relatively low resolution video frame image contains at least 320×240=76,800 pixels, the DGD must be determined for at least 3,072 5×5 image areas, which requires the calculation of at least 614,400 directions. Such calculations can therefore be prohibitively costly from a computational and time perspective. Of course, this problem only gets worse with higher resolution images.

Figure 2:
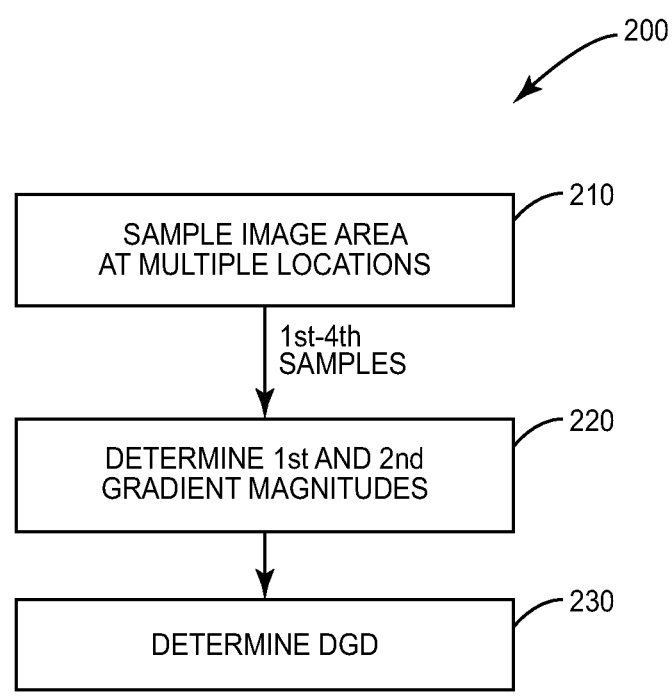
FIG. 2 shows an exemplary method for determining the dominant gradient direction as disclosed herein.

The solution disclosed herein provides significant time and computational savings by only requiring the determination of two directions associated with four samples within one image area, e.g., within an image area having 5×5 pixels. FIG. 2 shows one exemplary method 200 for determining the DGD for an image area 100. The process 200 includes sampling the image area 100 at multiple locations, e.g., four locations (block 210), where a first direction between two of the samples, e.g., between the first and third samples, is perpendicular to a second direction between the other two samples, e.g., between the second and fourth samples. For example, the first and second directions may comprise respective vertical and horizontal directions. The resulting samples may comprise values, e.g., between 0 and 255. Subsequently, a first gradient magnitude is determined for the first direction based on the first and third samples, and a second gradient magnitude is determined for the second direction based on the second and fourth samples (block 220). For example, the first gradient magnitude may be determined by taking the difference between the first and third samples, and the second gradient magnitude may be determined by taking the difference between the second and fourth samples. The DGD of the image area 100 is then determined based on an arctangent of a ratio between the first and second gradient magnitudes (block 230).

Figure 3:
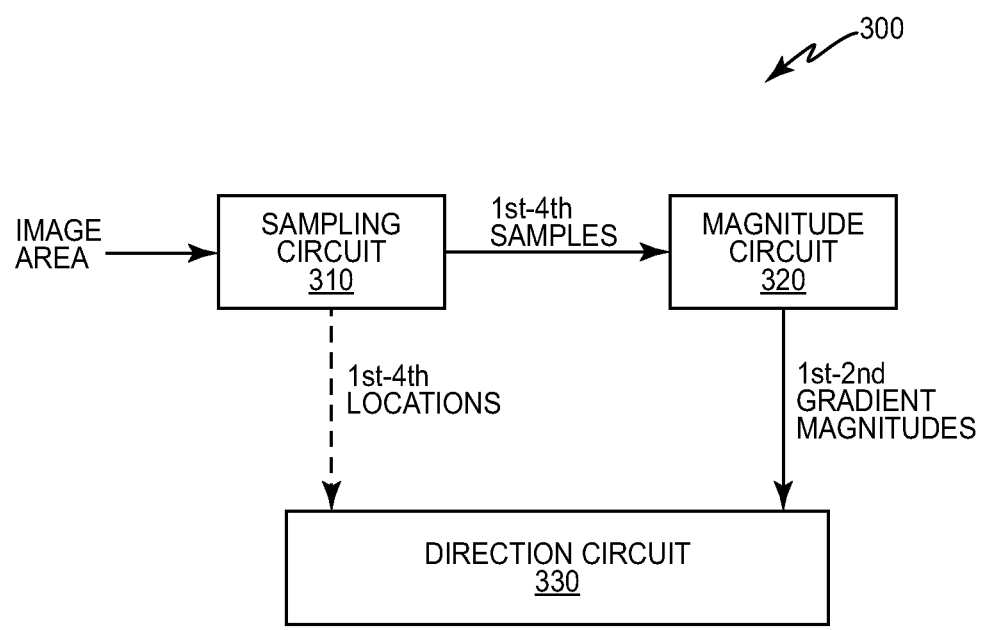
FIG. 3 shows an image area for an image, where the dominant gradient direction is determined according to one exemplary embodiment.

FIG. 3 shows one exemplary processing circuit 300 for determining the DGD of an image area 100 according to the method 200 of FIG. 2. Processing circuit 300 comprises a sampling circuit 310, magnitude circuit 320, and direction circuit 330. Sampling circuit 310 samples the image area 100 in at least four locations within the image area 100 to generate four samples, where a first direction between two of the samples, e.g., between the first and third samples, is perpendicular to a second direction between the other two samples, e.g., between the second and fourth samples. Magnitude circuit 320 determines the first gradient magnitude based on the two of the samples, e.g., by taking a difference between the first and third samples, and determines the second gradient magnitude based on the other two samples, e.g., by taking a difference between the second and fourth samples. Direction circuit 330 determines the DGD of the image area 100 based on an arctangent of a ratio between the first and second gradient magnitudes.

While the solution disclosed herein provides sufficiently accurate DGD results, the accuracy of the determined DGD depends, to some extent, on the specific locations of each sample within the image area 100. In general, each sample is selected to represent one section or quadrant of the image area 100. The only requirements levied on the sample selection, however, is that a first direction between two of the samples, e.g., between the first and third samples, is perpendicular to a second direction between the other two samples, e.g., between the second and fourth samples. While the first and third samples are selected in this example to form the first direction, it will be appreciated that such labeling is arbitrary, and that the second and fourth samples (or first and second samples or third and fourth samples) may be used to form the first direction. FIGS. 4-7 show exemplary image areas 100 having the same gradient as FIG. 1, but demonstrating different sample locations for the solution disclosed herein.

Figure 4:
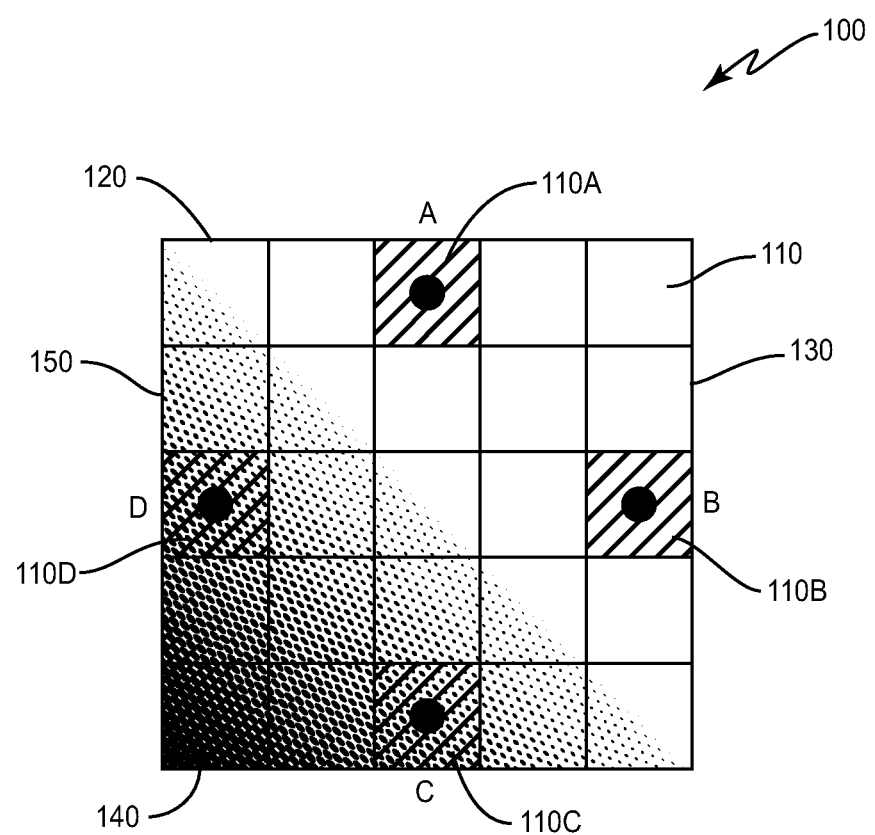
FIG. 4 shows a processing circuit used to determine the dominant gradient direction according to one exemplary embodiment.

FIG. 4 shows one exemplary image area 100, where each of the four samples are selected to be located in the middle of four different pixels 110, and where each of the sampled pixels 110 is located in the middle of one of the sides of the image area 100. In this example, each sample is only taken from that particular pixel 110. In particular, sample A is selected to be in the middle of the middle pixel 110A along the top side 120 of the image area 100, sample B is selected to be in the middle of the middle pixel 110B along the right side 130 of the image area 100, sample C is selected to be in the middle of the middle pixel 110C along the bottom side 140 of the image area 100, and sample D is selected to be in the middle of the middle pixel 110D along the left side 150 of the image area 100. As such, a first direction (e.g. formed between samples A and C) is vertical and a second direction (e.g., formed between samples B and D) is horizontal. The gradient magnitude of the first direction is the difference between sample A and sample C, and the gradient magnitude of the second direction is the difference between samples B and D. The DGD for image area 100 may then be calculated according to:

$$DGD = \arctan\left(\frac{A-C}{B-D}\right). \quad (1)$$

Figure 5:
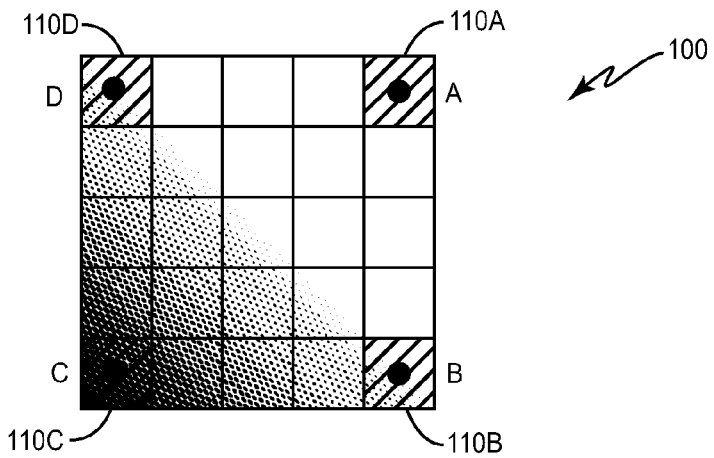
FIG. 5 shows an image area for an image, where the dominant gradient direction is determined according to another exemplary embodiment.

FIG. 5 shows another exemplary image area 100, where the four samples are selected to be the middle of four different pixels 110, and where each of the sampled pixels is located in one of the corners of the image area 100. As with the example of FIG. 4, each sample is only taken from that particular pixel. In particular, sample A is selected to be in the middle of the corner pixel 110A in the upper right hand corner of the image area 100, sample B is selected to be in the middle of the corner pixel 110B in the lower right hand corner of the image area 100, sample C is selected to be in the middle of the corner pixel 110C in the lower left hand corner of the image area 100, and sample D is selected to be in the middle of the corner pixel 110D in the upper left hand corner of the image area 100. As a result, the gradient magnitude of the first direction, e.g., between samples A and C, is the difference between sample A and sample C, and the gradient magnitude of the second direction, e.g., between samples B and D, is the difference between samples B and D. In this example, however, the first and second directions are rotated by 45° relative to respective first and second reference directions, e.g., respective vertical and horizontal directions. Thus, to calculate the DGD for this sample placement, a 45° offset is added to the result of the arctangent calculation. More particularly, the DGD for image area 100 may be calculated according to:

$$DGD = \arctan\left(\frac{A-C}{B-D}\right) + \alpha, \quad (2)$$

where α=45° (or π/4 radians) for the sample placement of FIG. 5.

Figure 6:
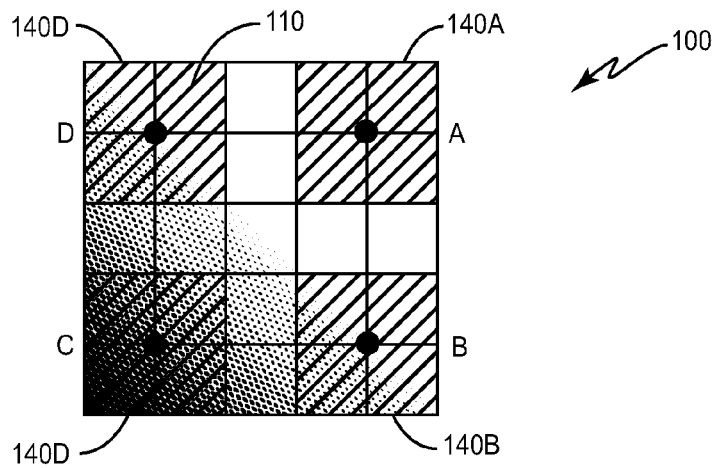
FIG. 6 shows an image area for an image, where the dominant gradient direction is determined according to another exemplary embodiment.

It will be appreciated that the solution disclosed herein does not require each sample to be located in the middle of a pixel. In other embodiments, the sample may be located near or on an edge of one or more samples, such that the resulting sample comprises an average of the surrounding pixel values. FIG. 6 shows an exemplary image area 100 where each of the four samples are located at the junction of a different four pixel sub-area 140. As a result, each sample includes the contribution of four pixels 110 within the image area 100. Thus, all but nine of the pixels 110 in the image area 100 contribute to the DGD determination. Because each sample is located at the junction of the four pixels 110 of the sub-area 140, each pixel 110 of the sub-area 140 contributes equally to the average. In this example, sample A is selected to be at the junction between the four pixels 110 of a first sub-area 140A in the upper right hand corner of the image area 100, sample B is selected to be at the junction between the four pixels 110 of a second sub-area 140B in the lower right hand corner of the image area 100, sample C is selected to be at the junction between the four pixels 110 of a third sub-area 140C in the lower left hand corner of the image area 100, and sample D is selected to be at the junction between the four pixels 110 of a fourth sub-area 140D in the upper left hand corner of the image area 100. The DGD for the image area 100 for this embodiment may then be calculated according to Equation (2), where $\alpha=45°$ (or $\pi/4$ radians). Because more pixels 110 of the image area 100 contribute to this DGD calculation, the accuracy of the resulting DGD may be better than that provided by the solution of FIG. 4 or FIG. 5.

Figure 7:
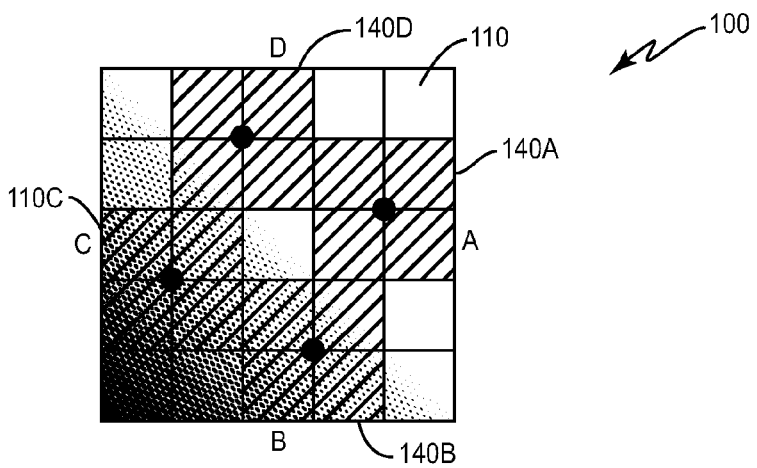
FIG. 7 shows an image area for an image, where the dominant gradient direction is determined according to another exemplary embodiment.

In another embodiment, the four pixel sub-areas are chosen such that the samples are the result of contributions from the pixels in the immediate vicinity of the center pixel of the image area 100, as shown in FIG. 7. As a result, each sample represents an average of the surrounding four pixels 110 of the sub-area 140, enabling the DGD to be calculated based on contributions from most of the pixels 110 in the image area 100 (i.e., all but nine pixels). For this example, the DGD is also calculated according to Equation (2), but here, $\alpha=18.43°$.

In image areas 100 shown in FIGS. 6 and 7, the samples are located at the junction of the four surrounding pixels 110. As such, each of the four surrounding pixels 110 contributes equally to the resulting average. It will be appreciated, however, that the samples may be placed at any location between multiple pixels, such that the surrounding pixels 110 contribute in an unequal fashion to the resulting average.

The solution disclosed herein may also advantageously use existing processing circuitry to obtain the samples "for free." For example, processing circuit 300 may comprise a graphics processor circuit in an image-capturing electronic device, which can provide some if not all of the functionality disclosed herein without any increase in hardware or computational cycles. In this case, the sampling circuit 310 may comprise the texturing circuit commonly present in most graphics processor circuits. The texturing circuit is a dedicated hardware block that performs sampling and interpolation incidental to reading in the image data. As a result, the texturing circuit provides the samples "for free." More particularly, the texturing circuit performs a filtering function such that when set to the "linear" mode, the texturing circuit captures and averages the pixel values within a filtering apron or passband. When the sample location is in the middle of a pixel, the filtering apron is centered in the middle of that pixel and generally only covers that pixel. Thus, the texturing circuit only captures information from that pixel. However, when the sample is located between multiple pixels, e.g., at the junction between four different pixels as shown in FIGS. 6 and 7, the filtering apron is centered at, e.g., the junction between those four pixels. As a result, the filtering apron covers the multiple pixels 110 in the sub-area 140, and the resulting sample represents an average of the contributions from all of the pixels 110 in the sub-area 140. Because this happens automatically when the texturing circuit captures the image data, the sampling operations are computationally achieved without additional hardware or computational costs, making this option particularly attractive for the solution disclosed herein.

The circuits disclosed herein may be implemented in hardware and/or software. In all embodiments, the functionality provided by the described "circuits" or "processors" in the drawing, e.g., the processing circuit 300, sampling circuit 310, texturing circuit, magnitude circuit 320, and/or direction circuit 330, etc., may more generally be implemented as dedicated hardware circuits (either analog or digital); as programmable logic together with appropriate firmware; as software modules executed on one or more stored-program processors or digital signal processors (DSP); or in any combination thereof. Additionally, each of the described circuits may represent, in part or in whole, the same physical components as one or more of the other circuits. Thus, for example, sampling circuit 310, texturing circuit, magnitude circuit 320, and/or direction circuit 330 may, in some embodiments, may all represent a single circuit or a common set of circuits while, in other embodiments, they may each represent separate independent circuits.

While the solution disclosed herein is presented in terms of four samples within an image area 100, it will be appreciated that the solution disclosed herein may be extended to any even number of samples greater than or equal to four samples. Further, while FIGS. 4-7 show a gradient having an exact 45° direction, it will be appreciated that this is purely for illustration purposes, and the solution disclosed herein is not limited to this angle. Any gradient at any angle may be evaluated by the solution disclosed herein.

Because the solution disclosed herein only requires the determination of two directions to determine the DGD for an image area 100, the solution disclosed herein significantly reduces the computational resources and time necessary to calculate the DGD for the image area 100. The resulting DGD has an accuracy on par with the conventional solutions. Indeed, because the DGD associated with conventional solutions is restricted to one of the M (e.g., 8) directions, and the DGD determined according to the solution disclosed herein is not so restricted, the DGD determined according to the solution disclosed herein is often more accurate than that attainable by conventional solutions.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of determining a dominant gradient direction of an image area comprising a plurality of pixels of an image, the method comprising:
    sampling the image area to determine first, second, third, and fourth samples at respective first, second, third, and fourth locations in the image area, wherein a first direction between the first and third locations is perpendicular to a second direction between the second and fourth locations;
    determining a first gradient magnitude for the first direction based on the first and third samples;
    determining a second gradient magnitude for the second direction based on the second and fourth samples; and
    determining the dominant gradient direction of the image area based on an arctangent of a ratio between the first and second gradient magnitudes.

2. The method of claim 1 wherein the first direction comprises a vertical direction and the second direction comprises a horizontal direction.

3. The method of claim 2 wherein sampling the image area comprises sampling one pixel located at each of the first, second, third, and fourth locations to determine respective ones of each of the first, second, third, and fourth samples.

4. The method of claim 2 wherein sampling the image area comprises, for each of the first, second, third, and fourth locations, averaging a plurality of samples associated with a plurality of pixels adjacent the corresponding location to determine the corresponding one of the first, second, third, and fourth samples.

5. The method of claim 1 wherein:
the first direction is offset from a first reference direction by a known angle;
the second direction is offset from a second reference direction by the known angle; and
the first reference direction is perpendicular to the second reference direction.

6. The method of claim 5 wherein determining the dominant gradient direction further comprises determining the dominant gradient direction for the image area by combining the known angle with the arctangent of the ratio between the first and second gradient magnitudes.

7. The method of claim 5 wherein sampling the image area comprises sampling one pixel located at each of the first, second, third, and fourth locations to determine respective ones of each of the first, second, third, and fourth samples.

8. The method of claim 5 wherein sampling the image area comprises, for each of the first, second, third, and fourth locations, averaging a plurality of samples associated with a plurality of pixels adjacent the corresponding location to determine the corresponding one of the first, second, third, and fourth samples.

9. The method of claim 1 wherein sampling the image area comprises reading image data for the first, second, third, and fourth locations using a texturing circuit to determine the respective first, second, third, and fourth samples.

10. The method of claim 9 wherein, for each of the first, second, third, and fourth locations, reading the image data using the texturing circuit determines an average of a plurality of samples associated with a plurality of pixels adjacent the corresponding location.

11. A processing circuit configured to determine a dominant gradient direction of an image area comprising a plurality of pixels of an image, the processing circuit comprising:
a sampling circuit configured to sample the image area to determine a first, second, third, and fourth samples at respective first, second, third, and fourth locations in the image area, wherein a first direction between the first and third locations is perpendicular to a second direction between the second and fourth locations;
a magnitude circuit configured to:
determine a first gradient magnitude for the first direction based on the first and third samples;
determine a second gradient magnitude for the second direction based on the second and fourth samples; and
a direction circuit configured to determine the dominant gradient direction of the image area based on an arctangent of a ratio between the first and second gradient magnitudes.

12. The processing circuit of claim 11 wherein the first direction comprises a vertical direction and the second direction comprises a horizontal direction.

13. The processing circuit of claim 12 wherein the sampling circuit is configured to sample the image area by sampling one pixel located at each of the first, second, third, and fourth locations to determine respective ones of each of the first, second, third, and fourth samples.

14. The processing circuit of claim 12 wherein the sampling circuit is configured to sample the image area by, for each of the first, second, third, and fourth locations, averaging a plurality of samples associated with a plurality of pixels adjacent the corresponding location to determine the corresponding one of the first, second, third, and fourth samples.

15. The processing circuit of claim 11 wherein:
the first direction is offset from a first reference direction by a known angle;
the second direction is offset from a second reference direction by the known angle; and
the first reference direction is perpendicular to the second reference direction.

16. The processing circuit of claim 15 wherein the direction circuit is further configured to determine the dominant gradient direction for the image area by combining the known angle with the arctangent of the ratio between the first and second gradient magnitudes.

17. The processing circuit of claim 15 wherein the sampling circuit is configured to sample the image area by sampling one pixel located at each of the first, second, third, and fourth locations to determine respective ones of each of the first, second, third, and fourth samples.

18. The processing circuit of claim 15 wherein the sampling circuit is configured to sample the image area by, for each of the first, second, third, and fourth locations, averaging a plurality of samples associated with a plurality of pixels adjacent the corresponding location to determine the corresponding one of the first, second, third, and fourth samples.

19. The processing circuit of claim 11 wherein the sampling circuit comprises a texturing circuit configured to sample the image area by reading image data associated with the first, second, third, and fourth locations to determine the respective first, second, third, and fourth samples.

20. The processing circuit of claim 19 wherein, for each of the first, second, third, and fourth locations, the image data read by the texturing circuit comprises an average of a plurality of samples associated with a plurality of pixels adjacent the corresponding location.

* * * * *